(12) United States Patent
Okuley

(10) Patent No.: US 7,432,876 B2
(45) Date of Patent: Oct. 7, 2008

(54) DISPLAY SYSTEM AND METHOD FOR IMAGE COPY TO A REMOTE DISPLAY

(75) Inventor: James M. Okuley, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 422 days.

(21) Appl. No.: 11/290,256

(22) Filed: Nov. 30, 2005

(65) Prior Publication Data

US 2006/0077117 A1   Apr. 13, 2006

Related U.S. Application Data

(62) Division of application No. 10/610,148, filed on Jun. 30, 2003, now abandoned.

(51) Int. Cl.
*G09G 5/00* (2006.01)
(52) U.S. Cl. .......................... 345/1.1; 345/1.2; 345/2.1; 345/2.2; 345/2.3
(58) Field of Classification Search .................. 345/1.1, 345/1.2, 2.1, 2.2, 2.3, 169, 901, 156
See application file for complete search history.

(56) References Cited

U.S. PATENT DOCUMENTS 6,633,759 B1 * 10/2003 Kobayashi .................. 455/419
7,027,035 B2 * 4/2006 Youden ....................... 345/169
7,046,213 B2 * 5/2006 Campbell et al. ............ 345/2.2

\* cited by examiner

*Primary Examiner*—David L Lewis
(74) *Attorney, Agent, or Firm*—Carrie A. Boone, P.C.

(57) ABSTRACT

A display system and method are disclosed. One embodiment of a display system comprises a position arm coupled to a first monitor and a second monitor that are each communicatively coupled to a computer. The system also comprises a position sensor operatively associated with the position arm and the sensor can generate relative position data of the first monitor after a user positions the first monitor adjacent to the second monitor. The system also comprises display logic communicatively coupled to the position sensor and operatively associative with the operating system of the computer, and the display logic can automatically cause display configuration features of the computer to be changed in response to receiving the relative position data.

16 Claims, 4 Drawing Sheets

DISPLAY SYSTEM AND METHOD FOR IMAGE COPY TO A REMOTE DISPLAY

This application is a divisional of application Ser. No. 10/610,148, filed on Jun. 30, 2003, now abandoned.

FIELD OF THE INVENTION

The present invention relates generally to the field of computers and, more specifically, to a display system and method.

BACKGROUND OF THE INVENTION

The proliferation of computing technologies has increased consumer and business reliance on electronic manipulation and processing of a variety of data, including textual, graphic, and image information, on personal computers (PCs) and other computers, and other devices such as web appliances and personal digital assistants (PDAs). Many users now prefer to view as much data as possible electronically, rather than on hard copy. In many cases, consumers and businesses utilize dual monitor or multi-monitor computer configurations to increase the data that can be simultaneously displayed over a viewing area that would otherwise be provided by a traditional one-monitor configuration. For example, a user may desire in some applications to adjacently position a second monitor to the left of the primary monitor, and in others above or below the primary monitor.

Unfortunately, such traditional multi-monitor configurations require users to manually change display configuration features of the computer configuration when they position one or more monitors relative to the location of the primary monitor. These changes to the computer configuration control cursor movement across the display screens of each of the monitors. Such manual changes are inconvenient, often requiring menu navigation that may be confusing to an inexperienced user and tedious for the experienced user. Moreover, such manual changes may result in menu navigation errors or configuration errors, which may compound user frustration and/or reduce the usability and thus the initial advantages of the multi-monitor configurations.

In other scenarios, it may also be convenient for users to work in a configuration where data may be viewed on one or more monitors remotely from the primary monitor. For example, a user may operate a PDA as a second monitor to remotely view and/or control content displayed on the primary monitor. One example of such a configuration includes software licensed under the name MEDIA CENTER from Microsoft Corporation, which permits a remote control to control functions for, among other functions, video recording and playback. Such a configuration permits the user to remotely both operate a computer and view a portion of data being displayed by the computer, and may also permit a client, coworker, or other person to view data on the primary monitor remotely from the user.

Unfortunately, such a configuration requires new software to be developed for each application that the user employs to manipulate data so that, for example, text and images on the remote device are properly sized for use in that application. As one example, MEDIA CENTER required development of a separate application that added features to functions such as MY TV, MY VIDEOS, or PLAY DVD in the operating system Microsoft Corporation licenses under the name WINDOWS XP so that the user can remotely invoke those functions using a remote device. This scenario requires design time and resources and, in many cases, necessitates technical support to assist the user so that the user can effectively use the software.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION

From the foregoing, it may be appreciated that a need has arisen for providing a display method and system. In accordance with the embodiments described herein, a display system and method are disclosed in which display configuration features of a computer are automatically changed in response to receiving relative position data from a position sensor of a monitor after a user positions the monitor adjacent to a second monitor. Various embodiments may provide none, some, or all of several important advantages. Users may change monitor configurations in dual monitor or multi-monitor environments without having to manually update any operating system or display configuration features, because aspects provide for automatic updates. Such freedom from manual updates allows the users to work more efficiently and productively than with traditional methods. Moreover, such automatic updates may reduce or eliminate navigational or other configuration errors that typically accompany manual methods, which may improve the usability and advantages of the multi-monitor configurations. In the following description, reference is made to the accompanying drawings, which show by way of illustration specific embodiments that may be practiced. However, it is to be understood that other embodiments will become apparent to those of ordinary skill in the art upon reading this disclosure. For ease of discussion, a display system supporting two monitors is illustrated and used in the described embodiments. However, this description contemplates any number of monitors that may be positioned adjacent to one another utilizing teachings of the description, subject to any limitations in software, hardware, or firmware. The following detailed description is, therefore, not to be construed in a limiting sense, as the scope of the present invention is defined by the claims.

Figure 1:
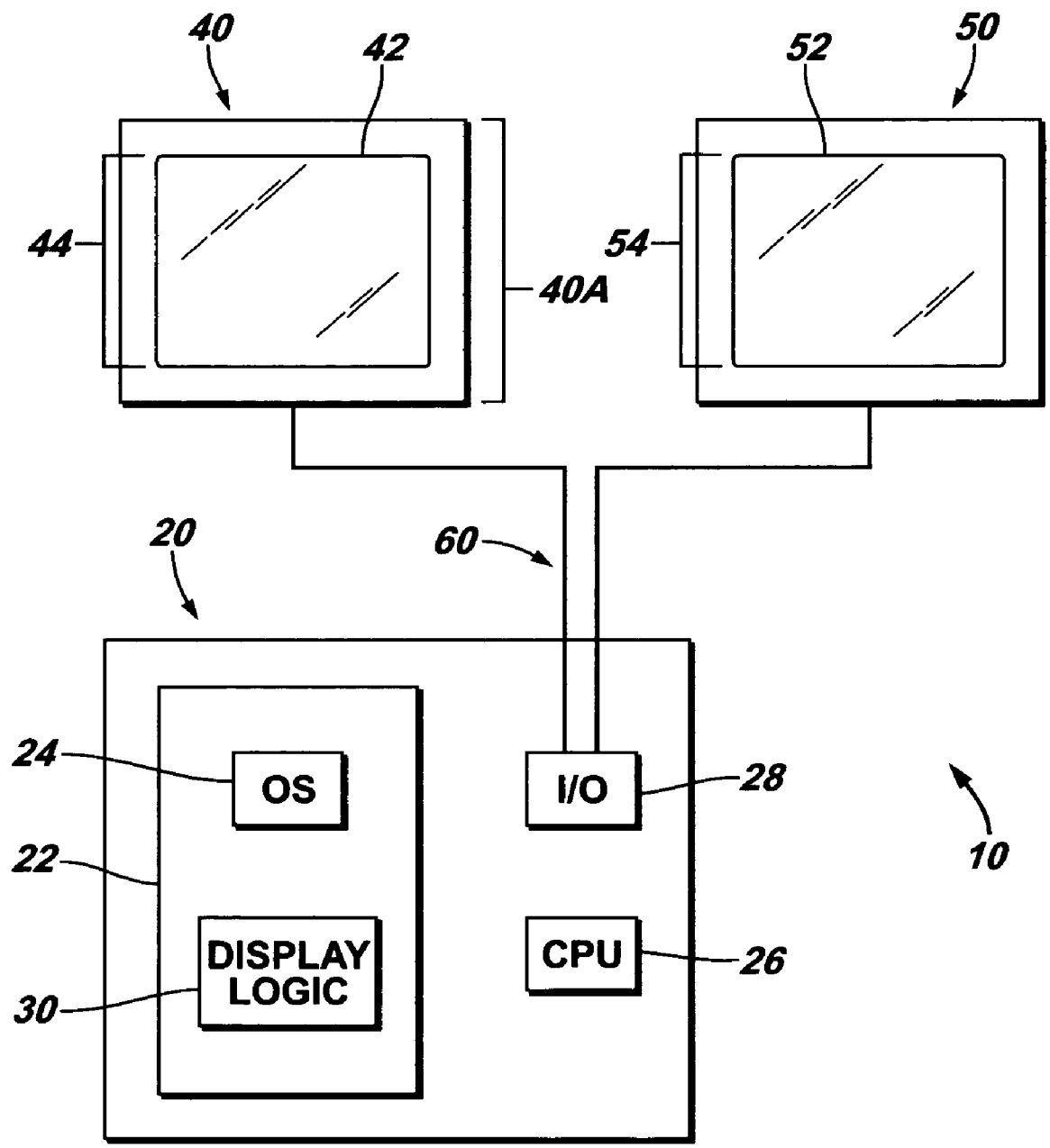
FIG. 1 is a block diagram of an embodiment of a display system.
Figure 2:
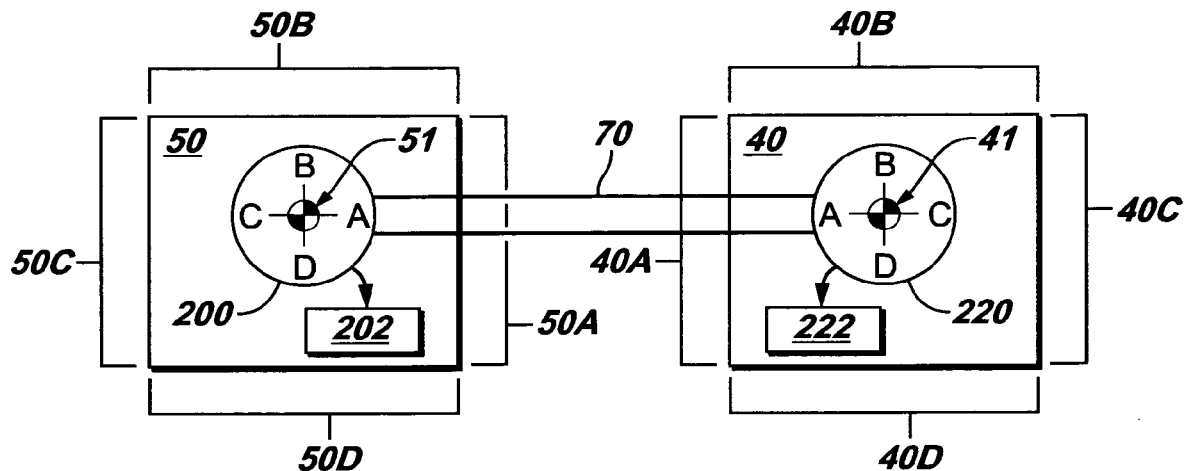
FIG. 2 is a rear view of an embodiment of monitors in a display system.

Referring now to FIGS. 1 and 2, a user has positioned side 40A of a monitor 40 adjacent to side 50A of monitor 50 in a system 10. One embodiment for system 10 includes a position sensor 220, controller 222, position arm 70 and display logic 30. In this embodiment, position sensor 220 is operatively coupled to a position arm 70 at a convenient position 41 on monitor 40 and can generate relative position data for monitor 50 that is positioned adjacent to monitor 40. The relative position data is then sent via controller 222 to computer 20, where display logic 30 operatively coupled with computer 20 causes display configuration features of computer 20 to be automatically updated in response to this relative position data. In this way, computer 20 automatically receives updates to the relative positions of monitor 50 and monitor 40. Content and cursor control are then properly maintained between a display screen 42 of monitor 40 and a display screen 52 of monitor 50 so that the user perceives a "seamless interface" between the display screens.

A typical computer system as shown in FIG. 1 includes a computer 20 having a variety of computer-related components that may be found in a representative computer. Computer 20 includes a central processing unit (CPU) 26 and input/output (I/O) unit 28, and a memory 22 that contains various programs used by computer 20 such as an operating system 24 and one or more application programs such as display logic 30. A user may communicate with computer 20 with a variety of input devices such as keyboard and mouse (not shown) to transfer information to and from computer 20 via I/O unit 28, and computer 20 responds to this input data by, among other things, displaying data on display screens 42 and 52 of respective monitors 40 and 50 via communication link 60. Computer 20 may be all or a portion of a general-purpose programmable computer adapted to execute an operating system 24, such a personal computer (PC) desktop or laptop, or Internet appliance, all of which are well known in the art and readily commercially available. Alternatively, computer 20 may one of a variety of more task-specific or custom-designed processing systems now known or hereafter developed that may be specifically configured to interface with various devices and to perform in accordance with the methods described herein.

Monitor 40 and monitor 50 are communicatively coupled, wirelessly or otherwise, with I/O device 28 of computer 20 via a communication link 60. Monitors 40 and 50 may be flat screen or traditional cathode ray tube (CRT) devices, and may Use a variety of technologies including, but not limited to, plasma display or any other display technology now known or hereafter developed. In particular applications, monitors 40 and 50 may be laptop or tablet PCs, or personal digital assistants (PDAs). Each monitor has four sides—sides 40A, 40B, 40C, 40D for monitor 40, and sides 50A, 50B, 50C, and 50D for monitor 50. Monitors 40 and 50 include respective display screens 42 and 52, which may display the same or different total numbers of pixels when viewed at the same resolution—that is, each may have the same or different dimensioned display areas. For ease of discussion, this description may refer to side 44 of display screen 42 and side 54 of display screen 52 as the "nearest sides" of the adjacently positioned monitors. As illustrated in FIG. 1, nearest sides 44 and 54 are those sides of display screens 42 and 52 closest to side 40A and side 50A, respectively. Sides 44 and 54, as "nearest sides", may be used to represent both a virtual boundary and physical boundary for the sides of display screen 42 and 52 that are located adjacent to one of sides 40A, 40B, 40C, 40D, and 50A, 50B, 50C, and 50D, respectively. Thus, were monitor 50 to be located "below" monitor 40, where side 40D is positioned adjacent to side 50B, nearest sides 44 and 54 would refer to those sides of display screens 42 and 52 closest to side 40D and side 50B, respectively. Monitors 40 and 50 each display picture elements (pixels), the smallest units of display screens 42 and 52 addressable via screen memory. For CRT monitors, a pixel corresponds to one or more phosphor dots configured to illuminate when struck by beams emanating from an electron gun. These pixels are organized in a raster grid with a logical width and height.

Figure 3:
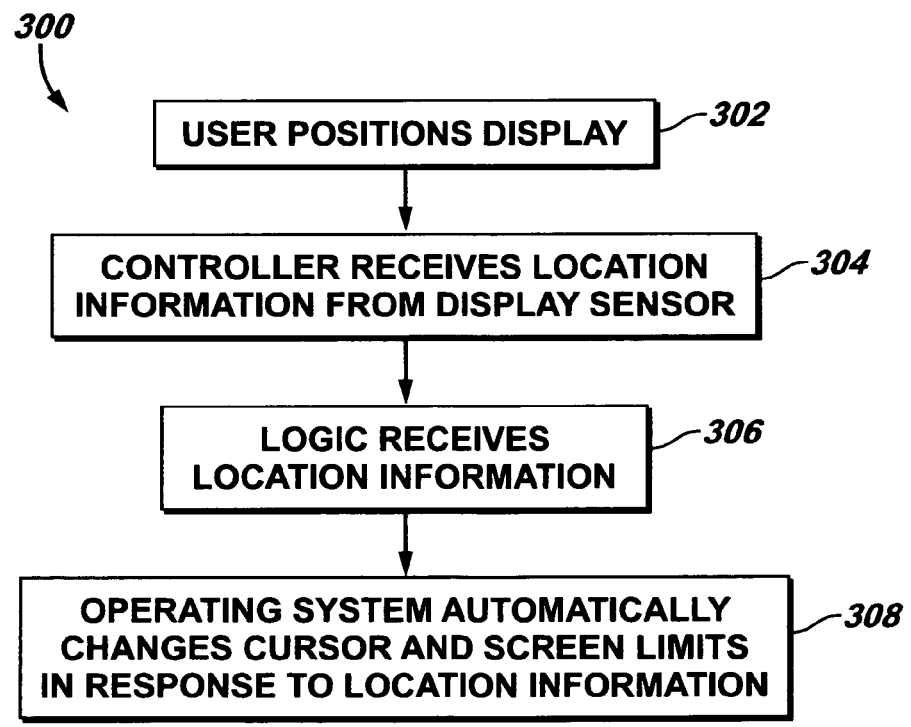
FIG. 3 is an example of a method that may be used in a display system.

Display logic 30 is operable to automatically adapt display configuration features in operating system 24 in response to relative position data according to a method such as the one discussed in further detail in conjunction with FIG. 3. As one example, in the embodiment shown in FIG. 1, display logic 30 may access and/or include programs or software resident on computer 20 and may be connected to, or include, a memory system, such as a cache or random access memory (RAM), suitable for storing all or a portion of these programs or routines and/or temporarily storing text or other data during various processes performed by display logic 30 while being executed in CPU 26. Alternatively, or in addition, display logic 30 may also include, or be coupled to, logic that may be implemented in a variety of hardware and/or firmware configurations, and may comprise special purpose digital circuitry, which may be, for example, application-specific integrated circuitry (ASIC), state machines, fuzzy logic, as well as other conventional circuitry. In other embodiments, display logic 30 may be user-programmable as desired.

Position sensor 220 is operable to optically, electronically or mechanically generate relative position data (that is, a position of monitor 50 relative to monitor 40) and may be, as but one example, a four-position switch coupled to a position arm 70. Controller 222 may be any suitable controller, such as a Universal Serial Bus (USB) controller that provides a suitable protocol to transfer relative position data to computer 20 via communication link 60.

In a particular embodiment, system 10 may include an additional position sensor 200 and controller 202 that may be similar or different from position sensor 220 and controller 222. For example, position sensor 200 may be a two-position switch coupled to position arm 70 at a convenient position 51 on monitor 50, or position sensor 200 may be coupled to a second position arm. In such a scenario, position sensor 200 may be used, for example, to detect whether monitor 50 is in a traditional "landscape" or "portrait" configuration after the user positions the monitor in a particular orientation. Position sensor 200 may generate orientation data and send the data via controller 202 and communication link 60 to computer 20, where display logic automatically causes display configuration features of the computer to be changed in response to the orientation data. In other embodiments, position sensor 200 may be located on monitor 40, and position sensor 220 may be located on monitor 50. That is, position sensor 200 may be used to generate the relative position data and, where applicable, position sensor 200 may be used to generate the orientation data. Other configurations contemplate the use of additional position sensors to generate orientation data for each monitor in any multi-monitor configuration as desired, including locating some or all of the position sensors and controllers on computer 20 or a switch platform (not explicitly shown). Convenient positions 41 and 51 are illustrated for convenience in FIG. 2 as generally centered at the rear of respective monitors 40 and 50, but may change depending on the implementation, or in response to user requirements. For example, position sensors 200 and/or 220 may be located at any convenient positions 51 and/or 41 that are operational with position arm 70 and respective monitors 50 and/or 40, and that otherwise do not obstruct user views of display screens 42 and 52.

Position arm 70 is operatively associated with position sensor 220 at convenient position 41, and may be operatively associated with other position sensors. In the embodiment illustrated in FIG. 2, position arm 70 may be a relatively straight member arm that is pivotably or rotationally coupled to each of monitors 40 and 50 at position sensors 220 and 200, respectively. Such coupling allows a user to place monitor 40 adjacent to any one of sides 50A, 50B, 50C, and 50D. As one example, position arm 70 may be physically or mechanically coupled to a sensor that is a four-position switch. As illustrated in FIG. 2, position arm 70 is positioned automatically in response to the monitors being positioned adjacent to one another, without necessitating further mechanical or other adjustment of position arm 70. In such a scenario, positioning of monitor 50 adjacent to monitor 40, and thus automatically orienting position arm 70, may automatically trigger rotation of switch 220 to generate the relative position data. Numerous other configurations are also contemplated that would accommodate various geometries of position sensors and monitors. For example, position arm 70 may include, but is not limited to, an L-shaped, accordion-shape, or curved member arm having one or more joints and/or segments and may be formed using a variety of technologies and materials to accommodate positioning of various monitor sizes and geometries, including in some applications supporting the weight of monitors 40 and/or 50.

Moreover, position arm 70 may also be used in an implementation where the position arm is operatively associated with position sensor 220 and/or position sensor 200, but does not support the weight of any monitor. As one example, one or both of position sensors 220 and 200 may be an optical sensor. In such a scenario, one example for a position arm 70 may be designed to return a particular optical pattern to position sensor 220, in response to which the relative position data is generated. In such an example, an optical signal indicating that side 40D is nearest side 50B—where monitor 50 is positioned "below" monitor 40—would differ from another optical signal indicating that side 40A is nearest side 50A—where monitor 50 is positioned to the "right" of monitor 40. Then, relative positional data may be generated in response to the optical signal. In this scenario, one example for a position arm may include a segment protruding from monitor 50 generally near convenient position 51 with a plurality of reflective surfaces, from each of which a particular optical signal is returned to position sensor 220 to indicate which sides of monitors 40 and 50 are nearest sides. Position sensor 70 may be any suitable patterned, absorbent or reflective material, and many suitable geometric configurations between position sensor 220, position arm 70 and monitors 40 and 50 may be used. Other implementations for position arms may dynamically move as monitor 50 is positioned relative to monitor 40, or be suitably positioned relative to position sensor 220. For example, a particular embodiment of a position arm 70 may be moved between the monitors by the user to intercept an optical signal from position sensor 220. Yet another embodiment of a position arm 70 may automatically move between the monitors to intercept an optical signal from position sensor 220 when monitor 50 is positioned adjacent to monitor 40. In this embodiment, movement may be, for example, at least partially in response to gravity.

FIG. 3 illustrates an example of a method that may be used in a display system. Various embodiments may utilize fewer or more steps, and the method may be performed using a number of different implementations, depending on the application. As an example, the method may include additional steps to accommodate a position sensor 200 that may be used to generate orientation data for monitor 50. The method may also include repetition of these steps where system 10 includes positioning of more than two monitors. As another example, in some applications, the method may include the automatic creation of a new operating system profile or context by logic 30, operating system 24, or a combination of the two in response to the relative position data.

Method 300 begins with display screen 52 being positioned adjacent to display screen 42 in step 302, which may be a manual process performed by the user, although some applications may permit automatic positioning. Position sensor 220 generates relative position data for the position created in block 302 and, in block 304, controller 222 receives the relative position data generated from the position sensor. In block 306, logic receives the relative position data. As illustrated in FIG. 1, display logic 30 is application logic operatively associated with computer 20. In a particular embodiment, display logic 30 may be used to condition the data to, among other things, suitably process it for revising the display configuration features. As one example, display logic 30 may detect a preset or predetermined position setting in response to the relative position data received from position sensor 220. For example, position sensor 220 may be a 4-position switch (such as a four-position rotary switch) that generates relative position data for "top", "bottom", "left", and "right" positions of monitor 50 relative to monitor 40. Here, the relative term "right" represents an embodiment such as the one illustrated in FIGS. 1 and 2, where monitor 50 is positioned adjacent to side 40A of monitor 40. After controller 220 transfers a relative position data "right" to computer 20, display logic may detect the value of "right" as a preset position setting and convert it to any value and format suitable for function calls, database settings, or any other parameter necessary for revising the applicable display configuration features in the system.

In block 308, the operating system of computer 20 automatically revises applicable display configuration features, such as cursor and/or screen limits, in response to the relative position data. One known method for revising applicable display configuration features, where operating system 24 comprises one of numerous versions of an operating system licensed under the name WINDOWS from Microsoft Corporation, such as WINDOWS XP, includes revising the "display properties" function, which interfaces with device drivers that supplement updates in the status of video display adapters by operating system 24 and in response to calls made to functions of operating system 24. A video display adapter is typically included with computer 20 to provide graphics output signals to a monitor and, as illustrated in FIG. 1, computer 20 may include one or more video display adapters (not explicitly shown as included in I/O device 28) to support a plurality of monitors such as monitors 40 and 50. When performed manually, the user selects a "settings" graphical user interface (GUI) in the "display properties" from the "control panel," and then drags the monitor icons (virtual or logical space) to match the physical arrangements of the user's monitors (physical space). As illustrated in FIGS. 1 and 2, the user would manually position the icon for monitor 50 adjacent to and to the "right" of the icon for monitor 40, where physically, side 50A is adjacent to side 40A. The "display properties" function also resets the outer limits of display screens 42 and 52 in response to values detected by the video display adapter or provided in a device context so that, when the cursor moves between display screen 42 and display screen 52, such movement appears as if the two display screens were contiguous (with only the border of the respective monitor between them). In this way, the virtual desktop and any graphic objects thereon will be handled and displayed in response to user input.

For ease of discussion and not by limitation, revision of the display configuration features in conjunction with a WINDOWS operating system such as WINDOWS XP, or WINDOWS 2000, will be briefly discussed in this description to illustrate various embodiments. Moreover, this description contemplates revision of other operating system or display configuration features as applicable, a process that should be well known to those skilled in the art, and includes revision of display configuration features and/or operating systems such as the one licensed from Apple Corporation such as versions of MAC OS X, or other operating systems now known or hereafter developed, including operating systems based in whole or in part on UNIX or LINUX technology, and proprietary operating systems. As illustrated in FIGS. 1 and 2, display logic 30 receives positional data "right" and causes appropriate data to be inserted into the "display properties". A call to "display properties" creates a device context updating the current state of relevant attributes for monitors 40 and/or 50. To initialize values for the device context, logic 30 may query monitors 40 and 50 for several of their characteristics and capabilities, such as screen dimension and pixel resolution values, icons and mouse cursors, and bitmap resources for defining the appearance of screen objects such as graphical buttons controlling the presence of display windows on display screens 42 and 52. Logic 30 provides functions relating to any GUIs, including functions to create, move, size, and remove screen objects such as display windows in display screen 42 and/or display screen 52, selection menus appearing in the display windows, graphical icons, and the like. Logic 30 may also control other resources such as communication ports, and may direct user input from an input device such as a mouse or keyboard to other applications. In response, logic 30 receives the relative position data, here a suitable value representing "right," and provides it to the display properties "settings" so that the monitor icons (virtual or logical space) automatically match the physical arrangements of the user's monitors (physical space). As illustrated in FIGS. 1 and 2, nearest sides 44 and 54 are adjacent to one another.

In response, the "display properties" function resets the cursor to move "seamlessly" across nearest sides 44 and 54, so that the cursor appears to skip over side 50A of monitor 50 and side 40A of monitor 40. Where display screens 42 and 52 are of unequal area or dimensions, the method can accommodate adapting the new virtual space by one of a variety of methods. In the example discussed above, a function call to "display properties" using the device context and the relative position data automatically accommodates the dimensions of display screens 42 and 52 so that the cursor moves "seamlessly" across nearest sides 44 and 54. In such a scenario, the resulting virtual or logical space may result in a non-rectangular shape. Moreover, where monitor 40 and monitor 50 may be independently used at different resolutions, logic 30 includes automatically selecting an applicable resolution to be used for both monitors to facilitate revising the display configuration features, although in some embodiments, the user may have an opportunity to override or pre-select the resolution.

In a particular embodiment, logic 30 may be implemented as a device driver, a graphical device interface subsystem (GDI), a subsystem of operating system 24, or as some combination thereof and, in particular applications, may interact directly with a graphics engine or a video display adapter's device driver. Generally, a user uses a presentation shell, such as a GUI, to communicate with an operating system and one or more applications such as display logic 30. Applications running on computer 20 may display information on, for example, display screen 42 through a GDI provided by the operating system. A GDI serves as a link between application and a graphics device, such as a video display adapter, and applicable function calls to either operating system 24 or a GDI may update the status of the video display adapter. In a particular embodiment, logic 30 may also include GUI management and/or a forking display driver to effectively split a graphics stream from a GDI into a number of parts equal to the number of monitors being used. A forking display driver is typically software code that may be dynamically inserted or removed when monitor 50 is respectively installed or removed. Logic 30 may also prevent problems in overlap of logical monitor boundaries by arranging the monitor spaces relative to each other in logical space to form contiguous non-overlapping regions. One known method for configuring multiple monitors in logical space to form a contiguous and non-overlapping region is described in U.S. Pat. No. 5,923,307, entitled "Logical Monitor Configuration In A Multiple Monitor Environment," filed Jul. 13, 1999.

Figure 4:
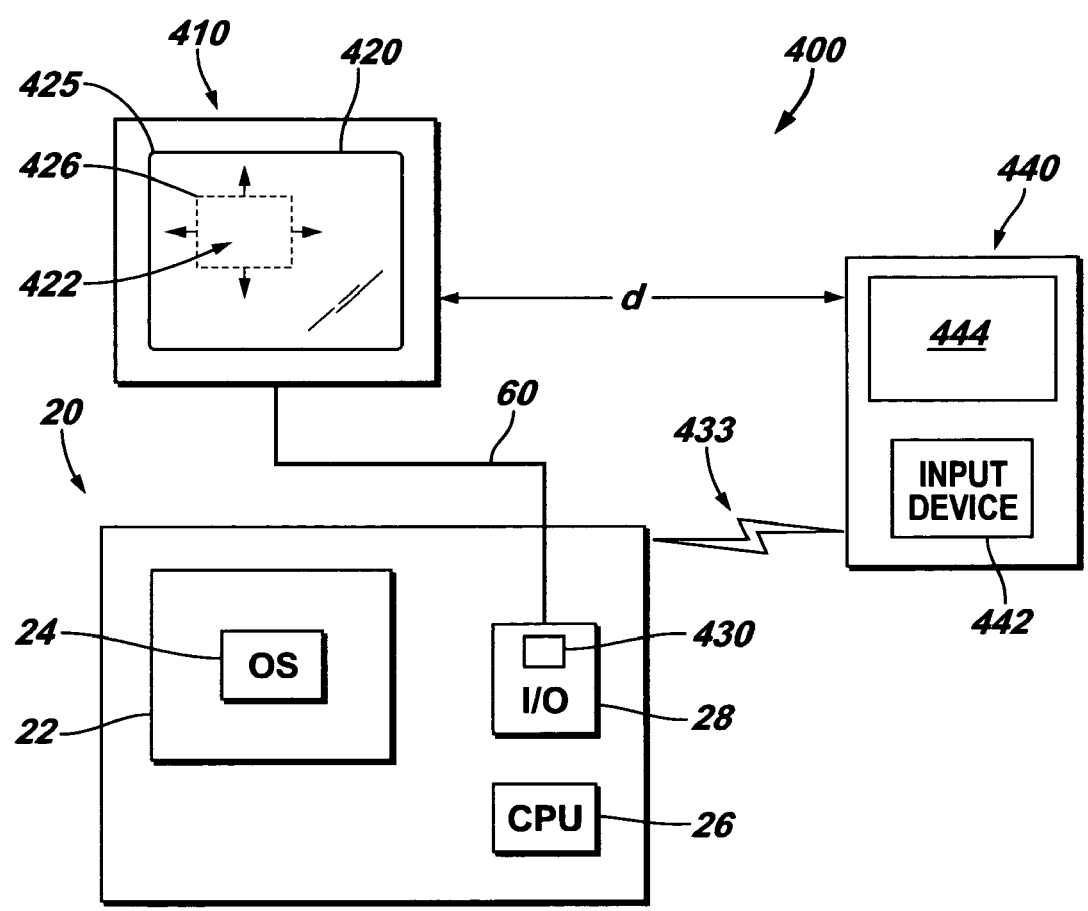
FIG. 4 is a block diagram of another embodiment of a display system.

FIG. 4 is a block diagram of another embodiment of a display system. In operation, a user may operate a device 440 at a distance d from a monitor 410 that is generally equal to or greater than a distance where the user can conveniently read the data displayed in display screen 420 (the "remote distance"). In this way, the user may conveniently view on display screen 444 a copy of the data that are displayed in a selected area 422 at the remote distance, without being near monitor 410. In the embodiment illustrated in FIG. 4, system 400 includes device 440 and device driver logic 430 operatively associated with a computer such as computer 20 illustrated in and discussed in conjunction with FIG. 1. Device driver logic 430 copies pixels from selected area 422 to device 440 in response to commands from the device and the dimension of the device display screen 444. In this way, the user may remotely both operate computer 20 and view a portion of data being displayed of display screen 420, and may also permit a client, coworker, or other person to view data on monitor 410 remotely from the user. Although FIG. 4 may not be drawn to scale, selected area 422 is of a similar size and dimension as display screen 444. System 400 may be used in conjunction with a method such as the one discussed in further detail in conjunction with FIG. 5.

Embodiments may reduce or eliminate the need to develop new software for each application that may be used with a remote device as a second monitor, which typically reduces the resources that would otherwise be required using traditional methods. Such resources typically include design personnel, computing resources and time and, in many cases technical support personnel, materials, and time necessary to assist the user in effectively using the remote device as an extension of the computing platform and monitor. As a result, the user will feel fewer constraints on how the user can work with a computer or monitor. Moreover, such design requirements may effectively limit the functions that are ultimately sold to computer users. As one example, MEDIA CENTER included development of an application that added features only to functions such as MY TV, MY VIDEOS, or PLAY-DVD in the operating system it sells under the name WINDOWS XP Professional. Here, while the user can remotely invoke those functions using a remote device, the user cannot view on the remote device what is actually displayed on the computer, without additional development of software code at the application level. Various embodiments contemplate no such limits. Utilizing teachings in the description, the user may view text and images on the remote device, at the same size they are displayed on the monitor, for use in many applications, such as Internet browsing, word processing, and controlling the audio and video functions previously discussed.

Device 440 is communicatively coupled, wirelessly or otherwise, via a communication link 433 via I/O unit 28 to computer 20 using one of a variety of methods known now or that may be hereafter developed. Device 440 may be operated at any remote distance that is convenient for the user, where distance d is limited only by either communication link 433 or the user's desire to operate computer 20 or view either selected area 422 or display screen 420. Device 440 also includes a display screen 444 and one or more device controls 442, and may be one of a variety of handheld or stationary devices including, but not limited to, PDAs, notebook computers and tablets. For ease of discussion, device 440 includes a single device control 442 for the user to designate and change the position of selected area 422 on display screen 420. As illustrated in FIG. 4, device control 442 may be a simple joystick button or slider with five functions: move right, move left, move up, move down, and "select," "OK," or "enter". In other embodiments, device control 442 may include one or more input devices now known or hereafter developed such as, but not limited to, buttons, joysticks, keys and keyboards, and touch pads and screens, and may include any number of functions and/or voice recognition technology as desired. Device 440 may also include an operating system such as the one licensed under the name PALM OS from Palm, Inc., or such as the operating system licensed under the name WINDOWS CE from Microsoft Corporation.

Monitor 410 is communicatively coupled to computer 20 by a communication link 60 via I/O unit 28. Display screen 420 represents a total area of data content—the number of pixels at a given resolution—that may be displayed on monitor 410, and selected area 422 represents the number of rows and columns of pixels at a given resolution that are viewable in display screen 444 of device 440 (the dimension of display screen 444). That is, selected area 422 includes fewer than or equal the number of rows and columns of the pixels that are viewable in display screen 420. In a particular embodiment, selected area 422 may also be made apparent by one of any number of methods including, but not limited to, designating corner vertices (usually four), shading, and/or highlighting of the number and dimensions of pixels in selected area 422. Such an embodiment may employ additional logic, depending on the application. As illustrated in FIG. 4, the arrows intend to represent repositioning of selected area 422 in response to the user operating device control 442.

Logic 430 may cause selected area 422 to be displayed in display screen 420 as described in further detail below, and copies the data within a selected area 422 over the remote distance to device 440 in response to receiving commands and the dimension of the device display screen from the device. As one example, in the embodiment shown in FIG. 4, logic 430 may be one of many known device drivers included in I/O unit 28 that can perform these data transfers. Logic 430 may access and/or include programs or software resident on computer 20 and may be connected to, or include, a memory system such as the one described in conjunction with FIG. 1. Alternatively, or in addition, logic 430 may also include or be coupled to logic that may be implemented in a variety of hardware and/or firmware configurations, and may comprise special purpose digital circuitry, which may be, for example, application-specific integrated circuitry (ASIC), state machines, fuzzy logic, as well as other conventional circuitry. In other embodiments, logic 430 may be user-programmable as desired.

Figure 5:
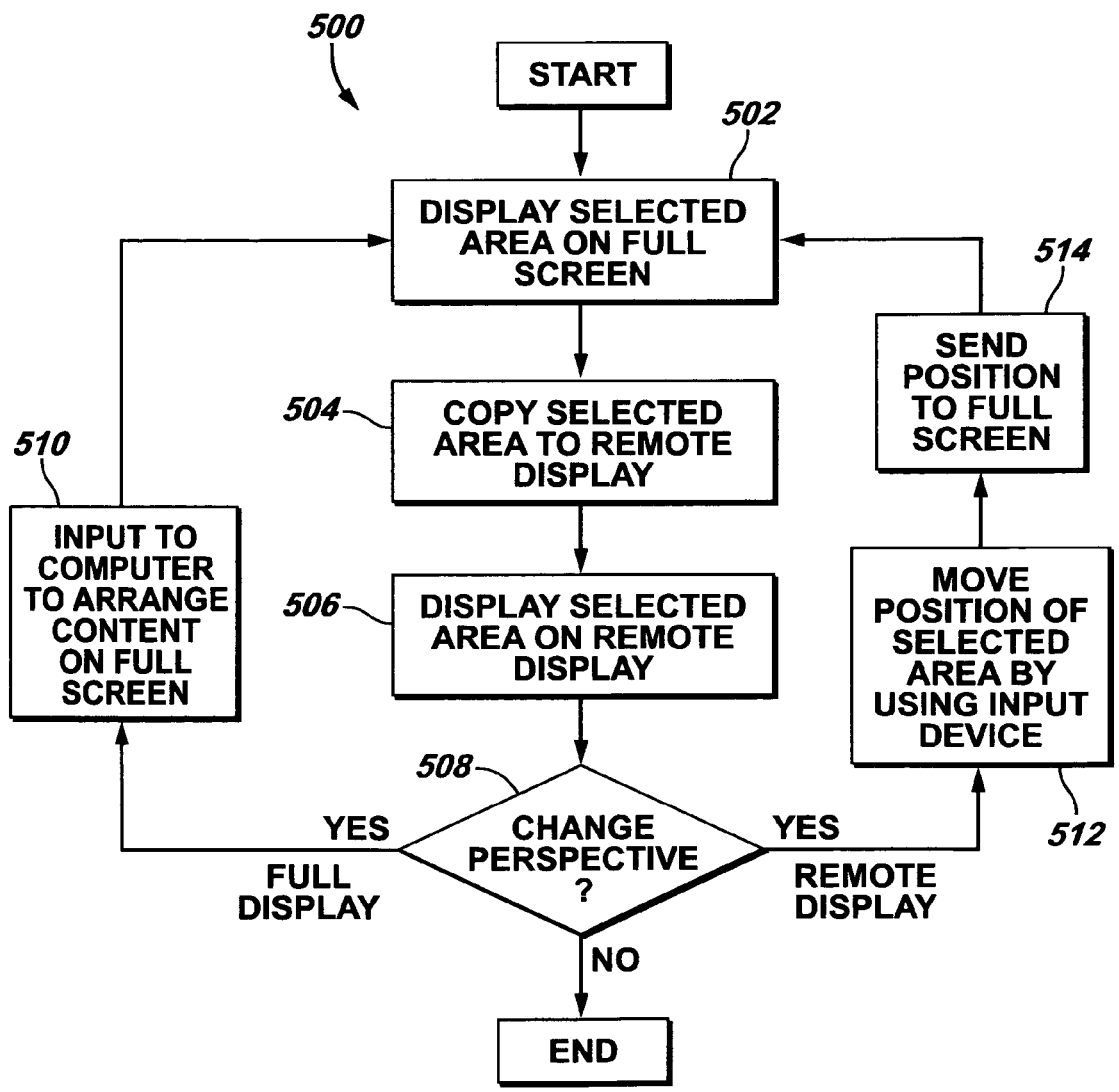
FIG. 5 is an example of another method that may be used in a display system.

FIG. 5 illustrates an example of another method that may be used in a display system. Various embodiments of method 500 may also utilize fewer or more steps, and this method may be performed using a number of different implementations, depending on the application. For ease of discussion, the method is described using a single device control 442 as described above, but the method may be performed by using a variety of input devices. As one example, in some applications, the method may include sending and processing particular commands to perform these steps and/or additional functions, such as textual commands entered into a keyboard or by stylus, for the handheld device.

Method 500 begins with block 502, where a selected area is displayed on the display screen 420. Selected area 422 may be initially displayed upon activation of device 440 by, for example, depressing device control 442, to select, "OK" or enter its display, which causes a command to be sent to logic 430. An example may be illustrative. Initially, as one example, depression of device control 442 may cause logic 430 to send dimensions, or one or more of the corner vertices of display screen 444 to display screen 420 at a predetermined location. Logic 430 may cause selected area 422 to be displayed in response to a dimension of the device display screen 444, display resolution, or other information provided to logic 430 by device 440. A predetermined location may be identified as an origin 425 representing the first pixel of display screen 420 to be displayed (as depicted in FIG. 4, the upper left vertex). In such a scenario, the first pixel 426 of selected area 422 would correspond to origin 425. Alternatively, the predetermined location may be any other convenient location, such as identifying pixel 426 at a center of display screen 420. Furthermore, logic 430 may condition the command before causing pixels from the selected area to be displayed on a monitor, or to be copied to device 440. As one example, logic 430 may detect the value of "down" as a preset setting and convert it to any value and format suitable for function calls, database settings, or any other parameter necessary for repositioning the selected area on display 420 by moving it downward by one row, or another predetermined number of rows desirable by the user. A copy of the pixels within the selected area is then sent to the device 440 in block 504 by a second select action as confirmation.

The method proceeds to block 506, where the selected area is displayed on display screen 444 in response to the command and the dimension of the device display screen. In a particular embodiment, blocks 502, 504, and 506 may comprise fewer steps, or be a single step-process. As one example, a single depression of device control 442 in block 502 may cause logic 430 to perform all processes of displaying, copying and/or displaying of the content within selected area 422. In other embodiments, multiple depressions of device control 442 may act as separate confirmation of each of blocks 502, 504 and 506 as desired.

In block 508, the method queries whether a change in perspective is requested. If not, the method ends. If a change in perspective is requested on display screen 420, then the method proceeds to block 510, where the user arranges the content on display screen 420 by providing input data to computer 20. For example, the user may wish to display a presentation after watching a DVD, or invoke and display other applications on display screen 420 by for example, using a mouse or keyboard with computer 20. The method then proceeds to block 502, to display selected area 422 on display screen 420 in response to the user's input. If the original coordinates of selected area 422 do not fall within the newly selected display screen 420, selected area 422 may be positioned at a predetermined location.

If a change in perspective is requested by device 440, then the method proceeds to block 512, where the user repositions selected area 422 by using device control 442 by, for example, laterally sliding or pressing it. The method proceeds to block 514, where the position is displayed on display screen 420 as selected area 422. In a particular embodiment, initiating movement of device control 442 may initiates the change in perspective by sending such data to logic 430, and blocks 508, 512, and/or block 514 may be performed in fewer steps or as a single-step process. The method then returns to block 502.

While the invention has been described with respect to a limited number of embodiments, those skilled in the art will appreciate numerous modifications and variations therefrom. It is intended that the appended claims cover all such modifications and variations as fall within the true spirit and scope of the invention.

I claim:

1. A display method, comprising:
   displaying data on a display screen of a monitor, the monitor comprising a first position sensor;
   communicatively coupling at a remote distance the monitor with a device having a device display screen, the device comprising a second position sensor, wherein the second position sensor is pivotably or rotationally coupled to the first position sensor by a position arm;
   automatically copying pixels from a selected area of the displayed data based on relative position data obtained from the first position sensor; and
   displaying the automatically copied pixels on the display screen of the device.

2. The method of claim 1, wherein orientation data is obtained from the second position sensor.

3. The method of claim 1, further comprising communicatively coupling the monitor with the device using wireless technology.

4. The method of claim 1, further comprising repositioning the selected area using the device.

5. The method of claim 4, wherein repositioning the selected area further comprises:
   receiving by device driver logic communicatively coupled to the monitor at least one positioning command from the device in response to manipulation of a device control; and
   repositioning on the display screen of the monitor the selected area in response to the at least one positioning command.

6. The method of claim 1, further comprising communicatively coupling the monitor with the device using device driver software code operatively associated with a computer communicatively coupled to the monitor.

7. A display system, comprising:
   a device display screen operable to display pixels copied from a selected area displayed in a display screen of a monitor that is communicatively coupled to a computer, the monitor comprising a first position sensor and the device display screen comprising a second position sensor;
   display logic operatively coupled with the computer, the display logic operable to transmit the pixels to the device in response to relative position data received from the first position sensor;
   wherein display logic in the computer automatically updates the configuration of the display screen of the monitor based on the relative position data.

8. The display system of claim 7, wherein the display logic is further operable to receive orientation data from the second position sensor, wherein the orientation data causes repositioning on the display screen of the monitor the selected area.

9. The display system of claim 8, wherein the display logic is operable to receive the relative position data and the orientation data using wireless technology.

10. The display system of claim 7, further comprising:
    a position arm disposed between the first position sensor and the second position sensor.

11. The display system of claim 10, wherein the first position sensor is optical and the position arm returns an optical pattern to the first position sensor to convey the relative position data.

12. The display system of claim 7, wherein the display logic is user-programmable.

13. The display system of claim 10, the position arm comprising a shape, wherein the shape is selected from a group consisting of L-shaped, accordion-shaped, curved shape having one or more joints and/or segments.

14. The display system of claim 7, wherein the first position sensor is a four-position switch.

15. The display system of claim 7, wherein first position sensor is disposed at the rear of the monitor and the second position sensor is disposed at the rear of the device display screen.

16. The display system of claim 7, further comprising:
    a controller to receive the relative position data from the first position sensor, wherein the controller transmits the relative position data to the computer via a communication link.

* * * * *